United States Patent
Schloer et al.

(10) Patent No.: US 11,563,716 B2
(45) Date of Patent: *Jan. 24, 2023

(54) METHOD FOR DATA COMMUNICATION USING RANDOM NETWORK ADDRESSES AND APPARATUS THEREOF

(71) Applicant: Prisma Analytics GmbH, Munich (DE)

(72) Inventors: Hardy Schloer, Munich (DE); Philip Gagner, Munich (DE)

(73) Assignee: Prisma Analytics GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,195

(22) Filed: Feb. 3, 2022

(65) Prior Publication Data

US 2022/0158971 A1 May 19, 2022

Related U.S. Application Data

(63) Continuation of application No. 16/864,827, filed on May 1, 2020, now Pat. No. 11,277,377, which is a (Continued)

(30) Foreign Application Priority Data

Nov. 2, 2017 (DE) ...................... 10 2017 125 649.0

(51) Int. Cl.
*H04L 61/5092* (2022.01)
*H04L 61/5007* (2022.01)
(Continued)

(52) U.S. Cl.
CPC ...... *H04L 61/5092* (2022.05); *H04L 61/5007* (2022.05); *H04L 61/5046* (2022.05); *H04L 2101/659* (2022.05)

(58) Field of Classification Search
CPC ............ H04L 61/5007; H04L 61/5046; H04L 61/5092; H04L 2101/659
(Continued)

(56) References Cited

U.S. PATENT DOCUMENTS 11,277,377 B2 * 3/2022 Schloer ............... H04L 61/5007
2003/0051014 A1 3/2003 Gluska et al.
(Continued)

FOREIGN PATENT DOCUMENTS

| CN | 104935614 A | 9/2015 |
|---|---|---|
| DE | 10 2017 109 383 A1 | 11/2017 |

(Continued)

OTHER PUBLICATIONS

Choi et al., Random and Linear Address Allocation for Mobile Ad Hoc Networks, IEEE Wireless Communications and Networking Conference, 2231-37 (2005) (Year: 2005).*
(Continued)

*Primary Examiner* — David P Zarka
(74) *Attorney, Agent, or Firm* — Myers Wolin, LLC

(57) ABSTRACT

A method for data communication and computation over a network whereby nodes of the network are capable of evaluating functions in the local environment of the node, and where the addresses of newly created or of newly connected network nodes are assigned at random, near uniqueness of node addresses being accomplished by using a random or pseudo-random method of choosing one address from a sufficiently large pool of network addresses.

11 Claims, 1 Drawing Sheet

Related U.S. Application Data continuation of application No. PCT/EP2018/080066, filed on Nov. 2, 2018.

(51) Int. Cl.
*H04L 61/5046* (2022.01)
*H04L 101/659* (2022.01)

(58) Field of Classification Search
USPC ........................................................ 709/245
See application file for complete search history.

(56) References Cited

U.S. PATENT DOCUMENTS

| | | | |
|---|---|---|---|
| 2007/0195729 A1 | 8/2007 | Li et al. | |
| 2013/0136140 A1* | 5/2013 | Tanimoto | H04L 12/4625 370/409 |
| 2016/0234161 A1* | 8/2016 | Banerjee | H04L 61/5007 |

FOREIGN PATENT DOCUMENTS

| | | |
|---|---|---|
| KR | 10-2014-0024142 A | 2/2014 |
| KR | 10-1560261 B1 | 10/2015 |
| WO | 2015066527 | 5/2015 |
| WO | 2015/139633 A1 | 9/2015 |

OTHER PUBLICATIONS

Non-Final Office Action issued for U.S. Appl. No. 16/864,827 dated Apr. 5, 2021.

Choi et al., "Random and Linear Address Allocation for Mobile Ad Hoc Networks", IEEE Communications Society / WCNC 2005, pp. 2231-2237.

International Search Report issued by the European Patent Office for corresponding International Patent Application No. PCT/EP2018/080066, dated Apr. 2, 2019.

Schloer, Hardy F. et al., "The Quantum Relations Principle Managing our Future in the Age of Intelligent Machines" 2016, pp. 9-216, V&R unipress Gmbh and National Taiwan University Press, Goettingen, Germany and Taipei, Taiwan [Reference in hard-cover book form was submitted to the USPTO via official US Mail].

Satoshi Nakamoto, "Bitcoin: A Peer-to-Peer Electronic Cash System", 2008, pp. 1-9, www.bitcoin.org, MIT License (x11 License).

P. Leach et al., "A Universally Unique IDentifier (UUID) URN Namespace," Network Working Group, Request for Comments: 4122, Category: Standards Track, Jul. 2005, pp. 1-32, The Internet Society.

* cited by examiner

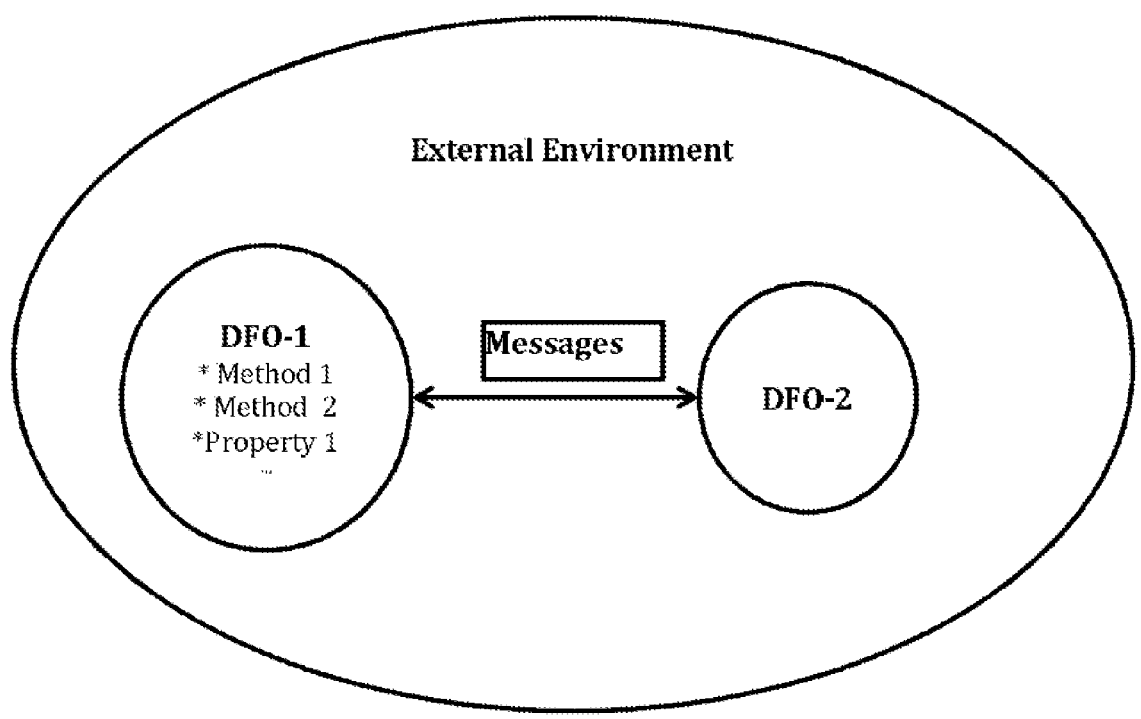

METHOD FOR DATA COMMUNICATION USING RANDOM NETWORK ADDRESSES AND APPARATUS THEREOF

CROSS REFERENCE TO RELATED APPLICATIONS

This application is a continuation of U.S. patent application Ser. No. 16/864,827, filed May 1, 2020, which is a continuation of International Application No. PCT/EP2018/080066, filed on Nov. 2, 2018, which takes priority from German Patent Application No. 10 2017 125 649.0, filed on Nov. 2, 2017, the contents of each of which are incorporated by reference herein.

TECHNICAL FIELD

The present invention is a method for building computing machinery out of multiple separate networked components, wherein the method of assigning addresses to individual network nodes is designed to make improbable, to any required degree of certainty, the possibility that one node in the network or sub-network has the same address as another node in the network or sub-network, and for communicating messages to and from such nodes with assigned addresses to other and possibly different nodes with possibly different addresses in said computer network. The multiple separate network nodes are capable of computing functions on the data sent to them, and of responding with the data resulting from said computations or transmitting such results to other nodes in the network. Collectively a system of such nodes implements a finite general purpose Turing machine.

BACKGROUND

Prior art for the present invention includes the use of universally unique identifiers (UUID), which is a numeric value, typically 128 bits, where the meaning of each bit is defined by any of several variants. In canonical form, such as that used by the IPv6 network protocol, a UUID of 128 bits is represented by 32 lowercase hexadecimal digits displayed in five groups separated by hyphens. An example of such a UUID is fd30:0000:0000:0001:ff4e:003e:0009:000e.

Prior art includes the use of a MD5 (or other sufficiently pseudo-random algorithm) hashed UUID derived from a URL, or a domain name, or an object identifier, or a distinguished nbame (DN as used in Lightweight Directory Access Protocol), as set forth in, for example, Version 4 of RFC 4122 of the Network Working Group, July 2005.

Prior art includes the use of a UUID that depends primarily on random numbers, for example that set out in Version 4 of RFC 4122 ("Leach-Salz") and Version 5 of RFC 4122 (SHA-1 hash over a namespace).

Prior art includes the technology disclosed in 2008 by the pseudonymous Satoshi Nakamoto in the paper entitled "Bitcoin: A Peer-to-Peer Electronic Cash System" that also disclosed as prior art computer techniques such as hashing, time-stamping, and solving proof-of-work problems.

Prior Art includes WIPO 1020140106871, Method for Convergence Communication Using Virtual Private Network and Apparatus Thereof, which instructs that randomly assigned IP addresses can be used in an apparatus whereby the random addresses are collected and bound to user terminals, then the bindings are transmitted to a binding server where they are stored for retrieval by call sessions.

Prior Art includes WIPO 201410100927.2, which teaches a method and device for data transmission over a backbone computer network comprised of a routing node and at least two data servers, wherein the first server transmits a message comprising communication information to the routing node through the backbone network. The routing node then determines the address of the target server according to the first message, and transmits the communication information to the target server.

Prior Art also includes WIPO 1020120090701, User Authentication System and Method in Mobile Device, which teaches the use of random numbers to authenticate users who have mobile devices, sending the random number to the device and requiring the user to authenticate by entering the number, such authenticity checking being done with a stored database of these random numbers matched with the user and device authentication.

The present invention is a method for communication between nodes in a network, where network nodes capable of computation are assigned randomly chosen network addresses. There is, in one preferred implantation of the method, no central storage system or repository of available network addresses. Thus, collisions can occur with a non-zero probability whereby two or more network nodes have the same address within the network.

Prior art has included some method for assignment of network identifiers distinguished from the present invention that (1) is not random, or (2) is random but with one or more central repositories that coordinate to ensure that no two nodes are assigned the same network address (a collision) or that, if such assignment is made, then one or the other node is immediately reassigned a new address.

This method of using a separate repository or database of available (or equivalently, non-available) network addresses has the advantage of ensuring that there are no collisions, or if collisions are detected, they are quickly resolved so that they do not happen again. Because network addresses are guaranteed to be unique, messages can easily be sent from one node to another.

In order to implement the methods of the prior art, each node desiring to send information to a receiving node must make inquiry of the central storage node (or multiple partitioned central storage nodes) to determine the destination address of any data packet to be sent from that sending node to that receiving node. This process of inquiring regarding node addresses takes a significant amount of time, which grows at least logarithmically with the number of nodes in the network. This prevents networks from having more than a billion or so network nodes capable of intercommunication.

Prior art includes WO/2015/066527, Method and Apparatus for determining to use X2 gateway for x2 interface, wherein a receiver in a wireless communication system receives a message in response to discovery of a neighbor node, to determine the method of communication, which may be direct communication or indirect communication via said gateway, choosing based on the address indication in the indirect method.

Prior art teaches that newly created network nodes must broadcast or otherwise transmit to existing network nodes its identification, including its network address or a unique hardware identifier. One or more of the receiving nodes then store the assigned network address into memory, where they are available through a communication path of arbitrary length to other nodes. This method has the disadvantage that the amount of memory required to store these network addresses grows at least linearly with the number of nodes in the network. This method further has the disadvantage that the time delay required for a node to discover the network address of another node increases at least linearly as the number of nodes increases.

SUMMARY

The present invention generally replaces a central address repository that can detect network address collisions with a network address space that is sufficiently large that the probability of collisions of randomly assigned network addresses can be made as small as desired, to a finite limit sufficiently small for practical purposes.

One advantage of the present invention is that no memory space is required in the sending or receiving nodes for the purpose of storing the addresses of other nodes.

Another advantage of the present invention is that the central repository of network addresses is eliminated, and no inquiry of the central repository need ever be made.

The probability of a collision (non-unique addresses assigned to different network nodes) can easily be calculated using probability theory, but is approximately $$p(n) \approx 1 - e^{-\frac{n^2}{2^{x+1}}}$$

which for small exponentials is $$p(n) \sim \frac{n^2}{2^{x+1}}$$

which is roughly $$\frac{n^2}{10^{(x+1)/3}}$$

where n is the number of UUIDs generated and x is the number of bits. This means, for example, that using x=128 bit numbers for UUIDs, and generating one million UUIDs every second for the next 100 years, (100 years is about 3,153,600,000 or $3*10^{10}$ seconds), the number of UUIDs generated would be approximately $n \approx 3*10^{16}$. Filling in the above formula, $n^2 \approx 10^{33}$ so that the probability of assigning the same UUID twice among the millions of trillions of UIDs generated would be about $10_{33}/2^{129} \approx 10^{33}/10^{43}$ which is $\frac{1}{10}^{10}$ or one chance in ten billion of having a single collision. For comparison, the average failure rate of uncorrectable memory errors per year is about 1.3%, so that the chances of address collision with 128 bit addresses is about a billionth of the chances of today's CPU failure rate.

One modification of the above includes the sending of broadcast messages containing a particular address or range of addresses that serves to ensure that any nodes with matching addresses are reassigned addresses (randomly generated), thus eliminating with an extremely high level of certainty any duplicate addresses. This may be thought of as a type of system conflict resolution where the conflict is supposed to be two nodes with the same address. For network address ranges of sufficient size, this modification is unnecessary.

One implementation of the present method uses 128 bit addresses. The advantage of using 128 bit addresses is that many of the address routing problems, as well as other definitional problems, have been extensively studied or solved, principally because IPv6 networks use 128 bits.

In one implementation of a system, nodes must store the addresses of other nodes with which they communicate. This permits the implementation of massively parallel computing systems whereby a node is constructed to compute a certain function, then said node is instantiated and replicated multiple times, each instance having a different, but knowable, network address. Said multiple nodes are configured to receive broadcast messages, and compute user-defined functions on data contained within the system, thereby achieving massively parallel communication.

The system described relies upon the use of random or pseudo-random algorithms. Prior art includes methods of generating both truly random and pseudo-random numbers of any desired size. Truly random numbers can be generated by any number of physical processes, such as radioactive noise or photonic generators. Pseudo-random numbers can be generated by any of a variety of well-known methods such as a linear congruential generator. Because physical phenomena generally have asymmetries and systematic biases that make their outcomes not uniformly random, a preferred method demonstrated in the prior art is to use a cryptographic hash function to obtain a uniform distribution of bits from a non-uniformly random source. The particular methods of generating random numbers is not a claim of this patent.

The nodes of the network are capable of doing computation. The preferred implementation is that the nodes execute statements in some language, preferably functional and of the nature of the Erlang language or the Lisp language. In the Erlang language: Every statement is a process Processes are strongly isolated Processes are easy to create and destroy Message passing is the manner in which processes interact You can send messages only to processes whose names you know Processes share no resources Error handling is non-local In Lisp or other functional language implementations of the present invention, the above requirements must still be met.

The nodes of the network preferably exchange messages through a shared-nothing asynchronous message passing system wherein every node has a queue of messages that have been sent by other nodes and not yet consumed. Messages are consumed when the node invokes the 'receive' primitive to receive messages that match desired patterns. The consumption of such messages may and often does involve the execution of parts of said messages as code in the computer language.

In the following example, using Erlang notation, we create a new node and execute some arbitrary function within that node:

RemoteProcessId=spawn(RemoteNode,FunctionCode, [Port,MaxCon]),

It is not necessary to the invention that the computer language used be Erlang, but it must be a language implementing the above-mentioned restrictions.

An advantage of this invention is that the time and overhead usually spent in assigning and maintaining system-wide network addresses in central repositories is eliminated. The importance of this advantage can be seen in a system with hundreds of billions of network nodes. Such systems are perfectly realizable with the advent of IPv6 network addressing, but traditional DHCP servers will be quickly swamped with requests in such networks, making them impossible.

Lacking DHCP address lists, the mechanism whereby one node discovers the address of another node is inherently functional. The addresses of nodes acting as data or functional servers must be calculated at the time of creation and passed throughout the system as arguments to function calls or alternatively, as part of multiple valued returns from function calls. This method is presently used in the computer language Erlang, among other languages including Common Lisp.

Each node, in addition to its node address, contains an environment. That environment is initially set to the environment of the node that created the instant node, but is modified as functions are received and evaluated by the node. In the preferred implementation, there is a function that, when evaluated, sets the environment of a node to any supplied value.

The basic computational operation of each node, on each port, is the same. Each node implements a loop consisting of READ, EVAL, and PRINT. The READ function accepts an expression from some port, and parses it into a data structure of the node's memory. The parsing method is determined by a component of the computational node termed a "passport". The EVAL function then takes that part of the data structure that represents the function to be applied, and applies it to the remainder of the data structure. The PRINT function then transmits the result to some port of the node as output, and the environment then returns to wait at the READ function. In Lisp notation, the computational operation is (LOOP (PRINT (EVAL (READ Passport$_{in}$)) Passport$_{out}$)) where Passport represents a function capable of identifying the particular structuring of data required for the input or output, and which identifies the port or ports from which functions and data are to be communicated.

Every node includes a Passport and an EVAL function. The EVAL function is defined in the node environment. It is not necessary that the EVAL function be the same for different nodes, and some security features can be achieved by limiting the functions available to EVAL, for example, removing those functions that can create new nodes or change port assignments, or allocate memory.

A node may have one or many Passports. Each Passport is bound to a port associated with the node's network address, and controls in a general sense what communications are possible through that port. The Passports also store the information regarding addresses of other known nodes and regarding transformation, structuring, and destructuring of functions and data crossing the said port. More than one Passport may be bound to a single node, in which cases inward communications through that port are read by each of the Passports. In the language of a Lisp system, Passports contain implementations of the "reader". Passports also contain the information about addresses of other nodes, and the capabilities of other nodes, that together make DHCP or other centralized name or address servers unnecessary.

One feature of the Passports is the ability to generate lists of addresses of other nodes that may be capable of answering a query. This is done by storing in the Passport triplets. The first element of the triplet is a query template. The second element is an identifier for the data to be queried, and the third is a function that collects node addresses. When a node requires a particular query to be evaluated, the Passport triplets are used to discover if the node "knows" about the query, that is, whether any first element matches the query in structure, and whether the available data domain, determinable from the second element of the triplet, matches the domain of the desired query. This may be done, for example, by wildcard match or regular expressions, but in general in both cases (query and data range) is done by calling a function that returns true or false if there is a match. If there is a match, then the third element of the triplet returns the iterator which will, when evaluated, return the identity of each of the nodes that the node believes to be capable of answering the query.

Passports are dynamic, not static, structures, and are updated as required by the operations of the node. In particular, node addresses are added to the "known node" list of the passport and to the "known capabilities" list, which is the list of triplets described in the preceding paragraph.

A special instance of a computing node incorporates functionality for inputting data from outside the system (implemented in the Passport used by the READ function), and another incorporates functionality for displaying data to users or other machines outside the system (implemented in the Passport used by the PRINT function). One or more instances of such a computing node is necessary for input and output from the system. This REPL (Read, Evaluate, Print, Loop) behavior and methods are not claimed in the general case in this patent application, but are described here to explain how the particular system works.

This description of a system comprised of network nodes capable of functional evaluation (i.e. computation) connected by randomly assigned network addresses is capable of optimization by a compiler that replaces network data transmission with function calls in the following way. A node object as described herein can be visualized as a cell in a system, connected to other cells by network fibers originating at a specific port of one cell and terminating at one port of the other cell. To gain efficiency, these network fibers can be replaced, in some cases, by a simple function call, provided that the two cells are co-located so that function calls are less inefficient than communication protocols over the fibers. An example would be two cells operating on the same server in the same Lisp environment. The replacement of network communications with parameters passed in function calls should preferably be done at the compiler level and should preferably be transparent to the users of the system and the persons or machines writing code to be evaluated by the nodes. All information necessary for this replacement, and for its inverse (replacing the function calls with communication over the network fibers) should preferably be kept in the Passports of the node that are bound to ports of the network address of the node. The address is not necessary for the function call, but must be retained in order for the said node to be available to other nodes that are more remote, in terms of less reduction in efficiency of communication over the fibers by this function call method.

In a second aspect, the present invention relates to a data fusion object and to a networked system for the evaluation of computable functions, with provisions for local or parallel functional evaluation, filtered data input and output, and process-dependent input and output, from one or several encapsulated functional objects to other such objects and to computer and data processing devices and systems located locally or on the internet.

The system according to the invention is comprised of so-called Data Fusion Objects (DFOs) capable of communicating with other DFOs through a network (N), which network N has a large number of available network addresses.

A DFO is a physical (hardware implemented) or logical (software implemented) object that:
  (1) exists in an external environment;
  (2) has an internal environment containing
    (i) as DFO methods and
    (ii) properties;
  (3) implements an expression evaluator
  (4) is capable of creating new DFOs within its environment;
  (5) is capable of destroying new DFOs within its environment; and
  (6) is capable of communicating with DFOs within its internal or external environment.

Some further aspects of the invention are defined in the appended claims. These aspects as well as other aspects of the invention are given and explained the description and the drawing.

The terminal node (highest level) of a DFO system is an external environment that is its own internal environment.

A DFO method is a computer process that implements a function whose input data are DFO properties, and whose evaluation modifies the internal state of the DFO and that may, but need not, cause the creation or destruction of one or more sub-DFOs and that may, but need not, cause the communication of data and environment to other DFOs, and that may, but need not, communicate data over one or more networks (including networks implementing IP such as the internet).

DFO properties are data that can be evaluated by DFO functions.

The external environment of a DFO is itself the internal environment of some other DFO, except that the highest-level external environment, whose external environment is itself.

BRIEF DESCRIPTION OF THE DRAWINGS

The single FIGURE illustrates DFOs in their respective environments.

DETAILED DESCRIPTION

Notation

In the following, examples of implementation details are be presented to clarify the textual explanation. These examples will generally be written in the computer language Scheme, and will be designated with a type font such as: "This is an example of an implementation detail." There is no requirement that such a system be written in Scheme or any other functional language, provided that the language used must be capable of computing finitely recursive functions.

Properties and Methods

Properties may themselves be represented as data, and data may be evaluated as methods. Methods are used as data when they are passed to a DFO and data are methods when received by a DFO and deconstructed to implement methods. In the above, the passing and receiving DFOs may the same DFOs or may be different DFOs.

In the descriptions and examples used herein, both methods (code) and properties (data) are written as S-expressions in a Lisp-like language. This is not a necessary or essential feature: a DFO system can use any computer language capable of defining or computing recursive functions.

An example of a method being used as data is, a DFO that takes as its input a method to compute $\log_{10}(x)$, and by modifying the code of that method, returns as output a method to compute $\log_2(x)$. In this example, the input data is itself a method.

For a DFO, there is no essential distinction between methods and properties (data), although when speaking of DFO systems, it is often useful to classify the internal computing functions as methods, and to classify expressions used as DFO inputs and outputs or as arguments to methods, as properties.

DFO Environments

The environment of a DFO is similar to a closure in the programming language Scheme. One difference is that environments are available for introspection, and not hidden as they typically are in Common Lisp or Scheme. This means that environments are treated as first class objects, capable of being sent, in whole or in part, to another DFO. The receiving DFO can therefore evaluate computable functions within the environment of the sending DFO, without the need for further communication between these two DFOs.

DFO Methods

Methods (typically implemented as functions and typically as lambda expressions) that are embedded in a DFO are first class objects. Because a DFO method is implemented as a lambda expression, it can be expressed as a list, then also reinterpreted as a method. This makes it possible to write self-modifying code and to build DFOs that modify methods that are transmitted to them.

Results of application of methods affect the local environment, and can also have side effects. One such side effect is that a method can send the result of its calculation to another DFO, implementing a call back mechanism.

(send-message:to Another-DFO '(send to '[*self*] some-stuff-to-evaluate))

where, as customary in Lisp or Scheme, the symbol single-quote (') quotes the following expressing and the symbol back-quote (`) unquotes (that is, causes evaluation of) the following expression.

DFO Addressing and Embedding

Inputs and outputs of DFOs are packets that are sent and received by network addresses of the form [addr]:port. This is preferentially implemented using IPv6. One DFO passes a message to another DFO by sending a set of IP packets on a particular port, and receives messages from other DFOs by receiving IPv6 packets from a particular port of the other DFO.

One DFO can be embedded in another DFO. This is implemented in IPv6 by subnetting. Typically, the subnetted DFO addresses are not expressed in the environments hierarchically above the embedding DFO; rather, messages to and from the subnetted DFO are sent to the parent DFO, which uses child DFOs as subroutines or subprocesses.

A DFO itself can be passed as data to another DFO either by passing the IPv6 address [DFO] or by passing the environment (including methods and properties) of the DFO being passed. In the first case, the DFO is a type of co-process. In the second case, a new copy of the DFO is created, whose address space and environment are independent of the first DFO.

An example is a DFO that takes as its input list of numerical values, then returns a list of English words for those numbers. This DFO could be passed to another DFO that takes English words as input and outputs the corresponding French words. This can be done in two ways.

The first way is to create the English-to-French DFO, with some IPv6 address [English-to-French] as well as, at the same hierarchical level, the DFO with address [Numbers-to-English]. Then create a DFO Numbers-to-French which receives a stream of numbers and calls by address the two DFOs defined above, outputting a stream of French words. Another way of doing this is to define Numbers-to-French within the environment of Numbers-to-English, assigning to it (for example) a different and newly created address.

Each DFO has its own internal environment and is capable of accepting from itself or other DFOs some set of expressions $\{S_j\}$ and of evaluating (computing) expressions $\{S_i\}$. Each DFO is capable of expressing the computed value $R_{j,n}(f_j(S_i))$ which is $S_j$ evaluated in the environment of $DFO_j$. and expressed (made available for access over some output port n by another set of DFOs, which often are the calling DFOs).

An implementation of the Data Fusion Object system can be done using IPv6. Such a system can be implemented as a set of IPv6 objects that can communicate with each other and with other devices or persons, who can be local or distant on the internet. Each DFO has its own (usually unique) IPv6 address, which is used as a handle or identifier for that particular DFO. As a matter of notation, the identifier [<$DFO_x$>]:port is the IPv6 address for $DFO_x$ with an IPv6 port specification of port.

Some DFO addresses [<$DFO_x$>] will be publically available on the internet. These addresses will be used for communication of the DFO system with users or with machines located on the Internet. Others will be local.

DFO local addresses are either specified by $DFO_{creator}$ or chosen by some hashing algorithm. The hashing algorithm could possibly be a sequential counter, or could be assigned by DFO function, or can be chosen by any other method that is likely to generate unique DFO identifiers, including possibly be a random number.

A random number can be used as a DFO address if speed of creation is required. Because of the very large size of the FD00::/8 (local) address space ($2^{40}$ or approximately a $10^{12}$, which is a trillion), the chances of DFO address collision are vanishingly small in most realizable systems, far less than the chance of hardware failure for most such systems.

If this address space is too small for some very large scale system, then another local scheme (including FC00::/7) or any other non-routed scheme could be chosen. Such schemes will generally not be in strict compliance RFC 2460, Internet Protocol, Version 6 (IPv6) Specification, issued by the Internet Engineering Task Force (IETF) and later RFCs describing the architecture and services supported by IPv6. If the standard assignments of IPv6 are overridden, the DFO system implemented with this type of network could potentially be of size $2^{128}$, which is approximately $3.8 \times 10E38$. For such large address spaces, chances of address collision are negligible even for very large systems.

Within the DFO framework, there is no distinction (other than the address generation algorithm) between local and other addresses. This permits seamless integration of DFO systems that are located elsewhere on the internet and elsewhere in the physical world.

Within the DFO system, the expression (evali S) means the expression S evaluated within the environment of DFOj.

The environment of two different DFOs can be quite different. An environment contains functional and data bindings as well as an expression evaluator. As an example, the expression (evaldfo-1 V) will evaluate to TRUE if V is set to TRUE in $DFO_1$ but (evaldfo-2 V) will return FALSE if V is set to FALSE in $DFO_2$.

Environments are not static. Evaluation of DFO functions can change the states of variables within the environment. One $DFO_{set}$ can set a variable in another $DFO_{get}$ by calling a function such as (dfo-evaluate [$DFO_{get}$]:0 (setf x value))

A DFO itself can be a data object, as mentioned earlier. The example given (changing the language of the words representing a list of numbers) could be pseudo-coded as follows:

```
(with-input-from-DFO DFO_self : port
    rs = (read data)   // The English-output DFO
        within rs {
            replace 'red' 'rouge';
            replace 'black' 'noir'
            ... }
)
```

In this example, [$DFO_{translate}$] has been given as an input to the DFO, and is used as a 'sub-dfo' to perform the translation. The higher level DFO knows nothing about

1. Creation of a DFO a. DFOs are created by other DFOs. A DFO system begins with one or more predefined DFOs, which are capable of creating other DFOs. DFOs have unique addresses, and at each address, have a number of input/output ports. The ports are used for communication between DFOs.

b. To create a new DFO, one of the predefined DFOs, for example, DFO1 with address [DFO1] calls the function (dfo-create args) where args is some set of arguments to set initial values and function bindings.

c. (dfo-create args) allocates some memory and processor resources and loads a copy of $DFO_{default}$ code into those resources.

d. A DFO may override this action by specifying a different source for the initial load by supplying arguments to dfo-create such as (dfo-create:default (new-load) args).

e. For example, a DFO may create another DFO that is a copy of itself by supplying arguments to dfo-create, such as (dfo-create:default *myself* args). In this case, where *myself* is the representation of the current state of the creating DFO, $DFO_{created}$ exactly equals $DFO_{creating}$ in every respect except that any activity of $DFO_{created}$ is suspended until the arguments to (dfo-create args) are evaluated.

f. Prior to any other activity, including I/O activity, a new DFO will evaluate the arguments given to the (dfo-create args) function.

2. Evaluation within a DFO a. When a DFO creates another DFO, for example by making a call to a method that we might name "(dfo-create args)". The newly created DFO typically returns at lease one value, within the environment of the first DFO ($DFO_1$), that is the address and communication port [$DFO_{created}$]:port of the created DFO, in this example, $DFO_{created}$. This permits the higher-level DFO to communicate with the newly-created lower-level DFO.

b. One of the possible arguments to the call to create a new DFO (named as above "dfo-create") is the specification of a communication port over which $DFO_{created}$ expects to exchange messages from $DFO_{creating}$. A possible implementation is (dfo-create:comport-in value1:comport-out value2 rest-of-args)

which can be abbreviated (dfo-create:comport value . . . ) if value1 is equal to value2. This communication port is typically zero for local DFOs but must be specified for DFOs which are accessible externally.

c. Evaluation of the arguments to (dfo-create args) typically causes the following steps:

i. DFO2's IPv6 address [$DFO_{self}$], is set, either by specifying an address range (dfo-create:myself range) or by an hashing function (typically randomly for local DFOs). [$DFO_{self}$] will therefore have different values within different DFOs.

ii. The address range range will typically be a single IPv6 address. Otherwise, the hashing function will select an appropriate address within the range.

iii. The address [$DFO_{parent}$] of 'parent' (here [$DFO_1$]) is bound to an appropriate pre-defined global variable. The term 'global' means global within the newly created DFO.

iv. The results of evaluation within $DFO_2$ of evaluating the arguments to the (dfo-create . . . ).

v. The arguments can set a port on which the parent will communicate code S for arbitrary execution, as well as the initial firewall code.

vi. The arguments typically set the port on which the parent will accept the returned value (evaldfo-2 S). That port is typically the same as the port immediately above.

d. The firewall of $DFO_2$ is typically set up with initial permissions that allow the injection of code and data into $DFO_{created}$ by $DFO_{creating}$. This injection typically is into some port (possibly port 0). The injected code is subsequently executed and typically a side-effect of execution is to make available on some set of ports (possibly port 0), the values derived from the computation of the injected code.

Note: Prior to evaluation of the arguments to (dfo-create . . . ), the environment the default environment; therefore any code injected by $DFO_1$ into $DFO_2$ and accepted for execution gives predictable results. It would be unusual, although possible through the arguments to (create-dfo args), for a DFO to reject or not evaluate expressions sent from $DFO_{parent}$ on the specified port. This ability would be useful in the operation of independent parallel processing systems.

e. By reason of the immediately preceding paragraph, $DFO_i$ will typically accept and subsequently evaluate S originating at [$DFO_{creating}$] and received on [$DFO_{created}$]: parent.

f. $DFO_1$ injects initialization code into $DFO_2$ g. This initialization code is executed (is evaluated) by $DFO_2$.

h. The result of the evaluation is presented on the specified output port.

3. Message Formats a. Typically, messages are passed by one DFO to another as executable objects such as LISP S-expressions.

b. One DFO can therefore (permissions allowing) set some variable in another DFO simply by passing a message (SETF variable-form value).

c. Setting a variable in another DFO can be implemented by a function such as (dfo-send address args). The syntax for setting the variable 'color' to 'red' can be as simple as (dfo-send DFO (SETF color red))

4. DFO Communication Reliability

Communications between different DFOs using IPv6 as a transfer protocol are probabilistic. That is, a message sent from one [DFO] will be routed to another [DFO] but, as with both IPv4 and IPv6 protocols, messages may take an arbitrarily long time, or dropped entirely. IPv6 options such as lifetime fields are used to control the scheduling and continued existence of inter-DFO communications. A DFO which requires high reliability of communication implements a protocol such as TCP, where acknowledge and confirmation messages indicate successful transmission and reception.

According to the second aspect, provided is a computer-implemented data fusion object, DFO, being capable of communicating with at least one other DFO through a communications network (N), the communications network (N) providing a number of available network addresses, each DFO having a separate and independent address on the communication network, the DFO being adapted to:

exist in an external computational environment;

implement an expression evaluator;

have at least one address identifying it for communication within the environment, and comprise an internal computational environment with predetermined methods and properties, being capable of adding new methods and new data structures to its internal computational environment, and being capable of:

creating new DFOs within its environment;

destroying new DFOs within its environment; and of communicating with DFOs within its internal environment or within the external environment.

The DFO may be further comprise an internal computational environment which contains at least one further DFO as defined above.

Herein a predetermined method is a computer process that implements a predetermined function whose input data are properties of the DFO and whose evaluation modifies an internal state of the DFO.

Herein the method is capable of causing creation or destruction of one or more DFOs and of causing communication of data and environment to at least one other DFO, and of communicating data over a communications network.

Herein properties are represented as data, and data are evaluated as methods.

Herein methods are used as data when they are passed to a DFO, and data are methods when received by a DFO and deconstructed to implement methods such that the DFO is capable of:

receiving from other DFOs their internal computing environment and using that received environment to compute methods of the sending DFO and methods internal to the receiving DFO and being capable of receiving from other DFOs expressions to be evaluated and data for those expressions, using either a received environment or the internal environment of the receiving DFO.

The DFO may be implemented in hardware and/or in logical software.

Herein, inputs to the DFO and outputs of the DFOs are packets that are sent and received using network addresses.

The DFO may be adapted to send messages to a second DFO by sending a set of IP packets on a predetermined port, and/or to receive messages from the second DFO by receiving packets from a predetermined port of the second DFO.

The DFO addresses may be of the format of an IPv6 method and the method and data transport mechanisms of the DFOs being implemented in the IPv6 specifications and using TCP/IP protocols.

Also defined according to the second aspect is a system for evaluating computable functions, the system comprising at least one DFO as defined above.

Also defined according to the second aspect is a of evaluating computable functions, with provisions for local or parallel functional evaluation, filtered data input and output, and process-dependent input and output, from one or several encapsulated functional objects to other such objects and to computer and data processing devices and systems located locally or on the interne, the method being executed by the system defined before.

What is claimed is:

1. A method for data communication and computation over a network comprising:
   evaluating functions by nodes of the network in a local environment of the nodes;
   assigning, at random, random addresses of newly created or newly connected network nodes; and
   accomplishing near uniqueness of the random addresses using a random or pseudo-random method of choosing one random address from a sufficiently large pool of network addresses,
   whereby near uniqueness of a node random address is ensured at intervals in a system by a broadcasting a message from a sending node requesting an acknowledge message sufficient to identify an address of a sending node and which is transmitted through the network or though a subnet in which the sending node is located by, upon receiving an acknowledge message, reassigning, again with a random choice, the network random address of either the sending node or a receiving node or both, wherein nodes whose random network address are changed in his manner then proceed to notify those nodes with whom they are connected by way of previous communications, and which are stored in node passports of their new random address.

2. The method of claim 1, wherein no node or collection of nodes in the network or a sub-network stores in memory the network addresses or identification of all other nodes.

3. The method of claim 1 wherein the network is divided into two or more subnets with a gateway between the subnets over which data can be sent to another subnet, and where the gateway is assigned non-random addresses on at least one side of the gateway connected to one or more of the multiple subnets but not including the subnet on which the method is used, said non-random addresses being determined by one or more fixed addresses or addresses determined by a fixed property of a node in the subnets on the sides of the gateway in which the method is not used to assign addresses.

4. The method of claim 1 wherein the network is divided into two or more subnets with a gateway between the subnets over which data can be sent to another subnet, and where the gateway is assigned non-random addresses on at least one side of the gateway connected to one or more of the multiple subnets but not including the subnet on which the method is used, said non-random addresses being determined by a server distinct from a node for which an address is being determined, said server determining network addresses of nodes that do not yet have a network address.

5. The method of claim 1 whereby the created nodes exchange messages according to a well defined layered protocol, such as Transmission Control Protocol (TCP) or User Datagram Protocol (UDP), wherein such messages are sent to existing nodes to cause the existing nodes to create new nodes, to cause node aptosis, to pass network traffic and to evaluate computing procedures.

6. The method of claim 1, whereby at the time of node creation or at such other time as is convenient, the communications between one network node and another are replaced by function calls generated by a compiler or subsystem that creates the nodes, such that a data portion of a communication which, in particular, includes function calls, from a first node is communicated instead by one or more arguments to a function call invoking methods of a second node within an environment of the second node.

7. The method of claim 1, wherein each newly created node is created by a creating node of the nodes of the network already in the local environment of nodes, and wherein upon creation of each newly created node, an internal environment of the corresponding newly created node is set to correspond to an internal environment of the creating node, and wherein functions received by the newly created node modify the internal environment.

8. Apparatus for carrying out the method for data communication and computation over a network, the apparatus comprising a Central Processing Unit for carrying out steps of the method according to claim 1.

9. A method for data communication and computation over a network comprising:
   evaluating functions by noes of the network in a local environment of the nodes;
   assigning, at random, random addresses of newly created or newly connected network nodes; and
   accomplish near uniqueness of the random addresses using a random or pseudo-random method of choosing one random address from a sufficiently large pool of network addresses,
   wherein the method is applied to an existing network with a method for adding newly created nodes with random addresses such that uniqueness of new random addresses is ensured by a broadcast message originating from a newly created sending node, said broadcast message containing a data packet that requests from every receiving node an acknowledge message sufficient to identify an address of a network node that conflicts or duplicates that of the sending node, which broadcast message and reply message are transmitted through the network or through a subnet in which the sending node is located and by, upon receiving an acknowledge message indicating that an existing node has the random address, the sending node triggers a node aptosis as a result of which the sending node is removed from a system, returning an error to the process that created the sending node, with said broadcast message consisting of an address that specifies a broadcast message and a data portion that contains a different random address to match, such that each node receiving the broadcast message checks the different random address to match and, if a match is found with a random address of a node receiving a broadcast, sends a return message indicating that the random address is already in use by the network.

10. A method for data communication and computation over a network comprising:

evaluating functions by nodes of the network in a local environment of the nodes;

assigning, at random, random addresses of newly created or newly connected network nodes; and accomplish near uniqueness of the random addresses using a random pseudo-random method of choosing one random address from a sufficiently large pool of network addresses, whereby the near uniqueness of a newly created node random address is ensured by a broadcast message from a newly created sending node requesting an acknowledge message sufficient to identify the random address of a network node that conflicts or duplicates that of the sending node, which acknowledgement message is transmitted through the network or through a subnet in which the node is located and by, upon receiving the acknowledge message indicating that another node has the random address, the sending node triggers a node aptosis as a result of which the sending node is removed from a system, returning an error to the process that created the sending node.

11. A method for data communication and computation over a network comprising:

evaluating functions by nodes of the network in a local environment of the nodes;

assigning, at random, random addresses of newly created or newly connected network nodes; and accomplish near uniqueness of the random addresses using a random pseudo-random method of choosing one random address from a sufficiently large pool of network addresses, wherein messages are exchanged by the nodes of the network through a shared-nothing asynchronous message passing system, and wherein each node has a queue of messages that have been sent by other nodes but not yet determined to be consumed, and wherein messages are determined to be consumed upon a node of the nodes invoking a receive primitive to receive messages that match a desired pattern.

* * * * *